United States Patent [19]

Yoshida et al.

[11] Patent Number: 4,521,813

[45] Date of Patent: Jun. 4, 1985

[54] RECORDING METHOD IN A FACSIMILE RECEIVER

[75] Inventors: Takashi Yoshida; Masakatsu Fujie, both of Ibaraki; Junichi Matsuno, Toride; Hideyuki Ouchi, Yokohama, all of Japan

[73] Assignee: Hitachi, Ltd., Tokyo, Japan

[21] Appl. No.: 446,204

[22] Filed: Dec. 2, 1982

[30] Foreign Application Priority Data

Dec. 4, 1981 [JP] Japan ................................. 56-194509

[51] Int. Cl.³ .............................................. H01M 1/22
[52] U.S. Cl. ......................................... 358/296; 358/; 358/300
[58] Field of Search ............... 358/296, 288, 280, 137, 358/267, 268, 302, 300

[56] References Cited

U.S. PATENT DOCUMENTS 4,302,781 11/1981 Ikeda et al. ...................... 358/288

Primary Examiner—John C. Martin
Assistant Examiner—Edward L. Coles
Attorney, Agent, or Firm—Antonelli, Terry & Wands

[57] ABSTRACT

A line by image signal in a facsimile transmission is transmitted at a random time interval. A minimum time interval (highest record speed) is determined by a transmission ability of a transmission line. A paper feed drive motor requires a considerable time to accelerate from a stop state to the highest record speed. The image signal transmitted during the acceleration time is stored in a memory to prevent an error in the recording and the paper feed drive motor is controlled by a speed pattern determined by the number of lines stored in the memory. Thus, a response ability of the drive motor is compensated and a high response is attained. The memory needs only a capacity sufficient to store the data before the highest record speed is reached.

17 Claims, 11 Drawing Figures

RECORDING METHOD IN A FACSIMILE RECEIVER

BACKGROUND OF THE INVENTION

The present invention relates to a recording method in a facsimile receiver, and more particularly to a recording method in a facsimile receiver which is suitable for noise reduction, provides an improvement of the quality of the recorded image and makes possible recording of an image transmitted at a high rate.

The prior art recording methods in a facsimile receiver include a variable speed recording method in which the paper is fed by one line for each one line of image signals received from the receiver and a constant speed recording method in which one page of image signals are temporarily stored in a memory and the memory data is read out at a constant time interval and the paper is fed at a constant speed. In a high speed image recording, the former method requires a fast response drive motor for the paper feed. However, since there is a limit in the performance of the drive motor, the variable speed recording at higher than a certain limit is not attainable. Such a high performance motor also causes an increase in the size of the apparatus and the cost thereof. The latter method is suitable to high speed recording, but a memory of two-page capacity is required for the continuous recording. As a result, a large capacity memory is required and hence the cost increases.

The one line of image signals in the facsimile transmission is transmitted not periodically but at a random time interval. A minimum time interval (highest recording speed) is determined by the transmission capability of the communication line. The paper feed drive motor in the facsimile receiver must have an ability to follow a speed range varying from a low recording speed to the highest recording speed. However, a considerable time is usually required to accelerate the drive motor from its stop state to the highest recording speed. In the high speed facsimile, since the image signals are transmitted at a time interval shorter than the acceleration time, it is difficult to follow the speed change and a recording error results. A continuously variable speed sub-scan system has been proposed in which coded compressed information transmitted during a time period from the stop condition of the motor to the acceleration to the highest recording speed is stored in the buffer memory and a sub-scan rate is controlled by the number of coded bits in the buffer memory. In this system, however, since the number of lines stored in the buffer memory is unknown, line-by-line fine control is not attainable but a rough speed is instructed. In addition, the speed abruptly changes at the start or stop of recording and the quality of the image is degraded and noises and vibrations occur. Since a conventional transmitter includes the stop of recording, the communication is impeded.

SUMMARY OF THE INVENTION

It is an object of the present invention to provide an inexpensive recording method in a facsimile receiver which controls a paper feed motor by a speed pattern depending on the number of lines stored in line memories to effect a line-by-line fine speed control in order to attain high speed image recording in the facsimile receiver.

In accordance with a feature of the present invention, in a variable speed sub-scan system facsimile receiver having a receiving unit for demodulating a coded facsimile signal to an image data signal, a paper feed unit operable at a variable speed in response to a signal from the receiving unit and a recording unit for forming an image on paper, a plurality of line memories for temporarily storing the image data line by line are connected to a selector, reading from and writing into the line memories are repeated in an endless fashion cycling from a first stage to a final stage thence to the first stage, a number-of-line memory detector for detecting the number of data containing line memories and a speed commanded for issuing a variable speed command to the paper feed unit depending on the number of data containing line memories are provided, the image data is temporarily stored in the line memories and the paper feed speed is controlled by a speed pattern depending on the number of data containing line memories, the image signal is read out, one line at a time, from the line memories for each one-line movement of the record paper, and the image is recorded on the record paper in the recording unit.

DESCRIPTION OF THE PREFERRED EMBODIMENTS

Figure 1:
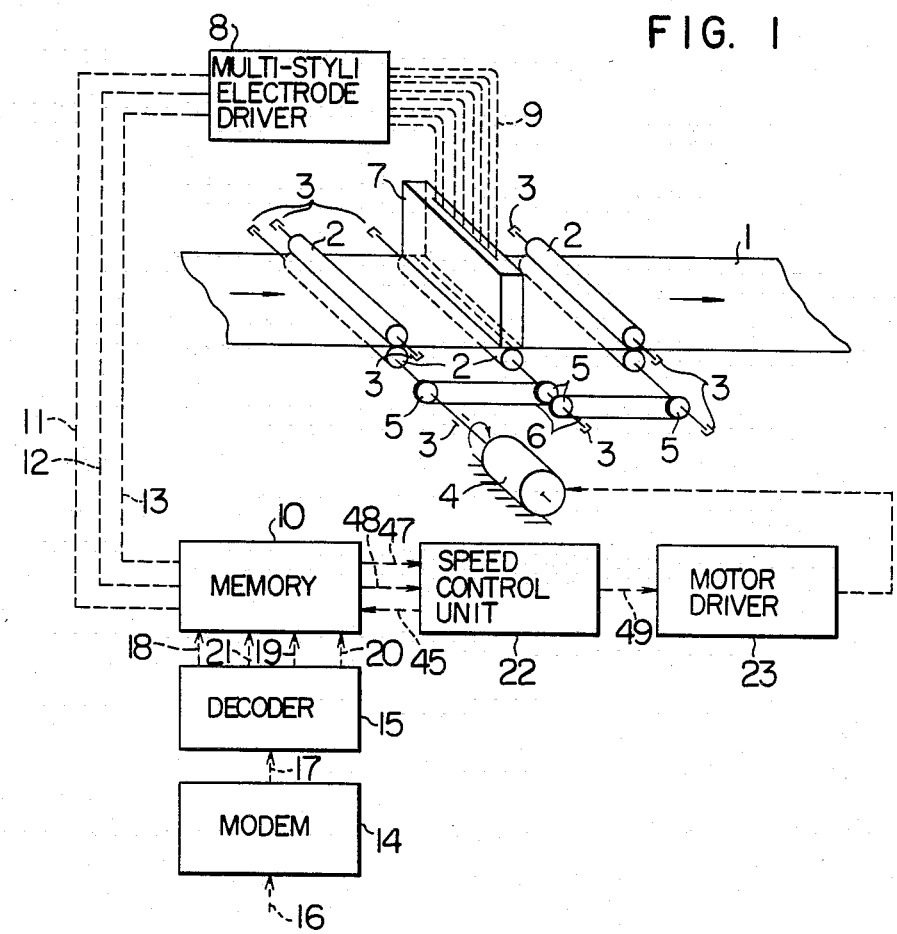
FIG. 1 illustrates one embodiment of a facsimile receiver of the present invention, which is applied to an electrostatic recording type facsimile receiver.

FIG. 1 illustrates one embodiment of a recording method in a facsimile receiver of the present invention, which is applied to an elctrostatic recording type facsimile receiver. A mechanism for feeding a record paper 1 comprises rollers 2 which hold the record paper 1 at a plurality of positions on both sides of the record paper 1, bearings 3 for supporting the rollers 2, a pulse motor 4 for driving the rollers 2 and pulleys 5 and belts 6 for transmitting the rotation of the pulse motor 4 to the rollers 2. By driving the pulse motor 4, the record paper 1 is moved while it is held by the rollers 2. The distance of movement of the record paper 1 is proportional to the rotation step angle of the pulse motor 4.

A recording unit for charging an electrostatic latent image on the recording paper 1 comprises a multi-styli electrode body 7 and a multi-styli electrode driver 8. The multi-styli electrode body 7 charges the electrostatic latent image on the record paper 1. The multi-styli electrode body 7 has a number of needle electrodes linearly arranged at an equi-interval. The respective electrodes are connected to terminals of the multi-styli driver 8 through lead wires 9. The multi-styli driver 8 operates in response to received image data 11, a one-line image transfer clock 12 and a one-line image start pulse 13 from a memory 10, and supplies voltages corresponding to monochromatic image data to the electrodes of the multi-styli electrode body 7 through the lead wires 9.

Figure 2:
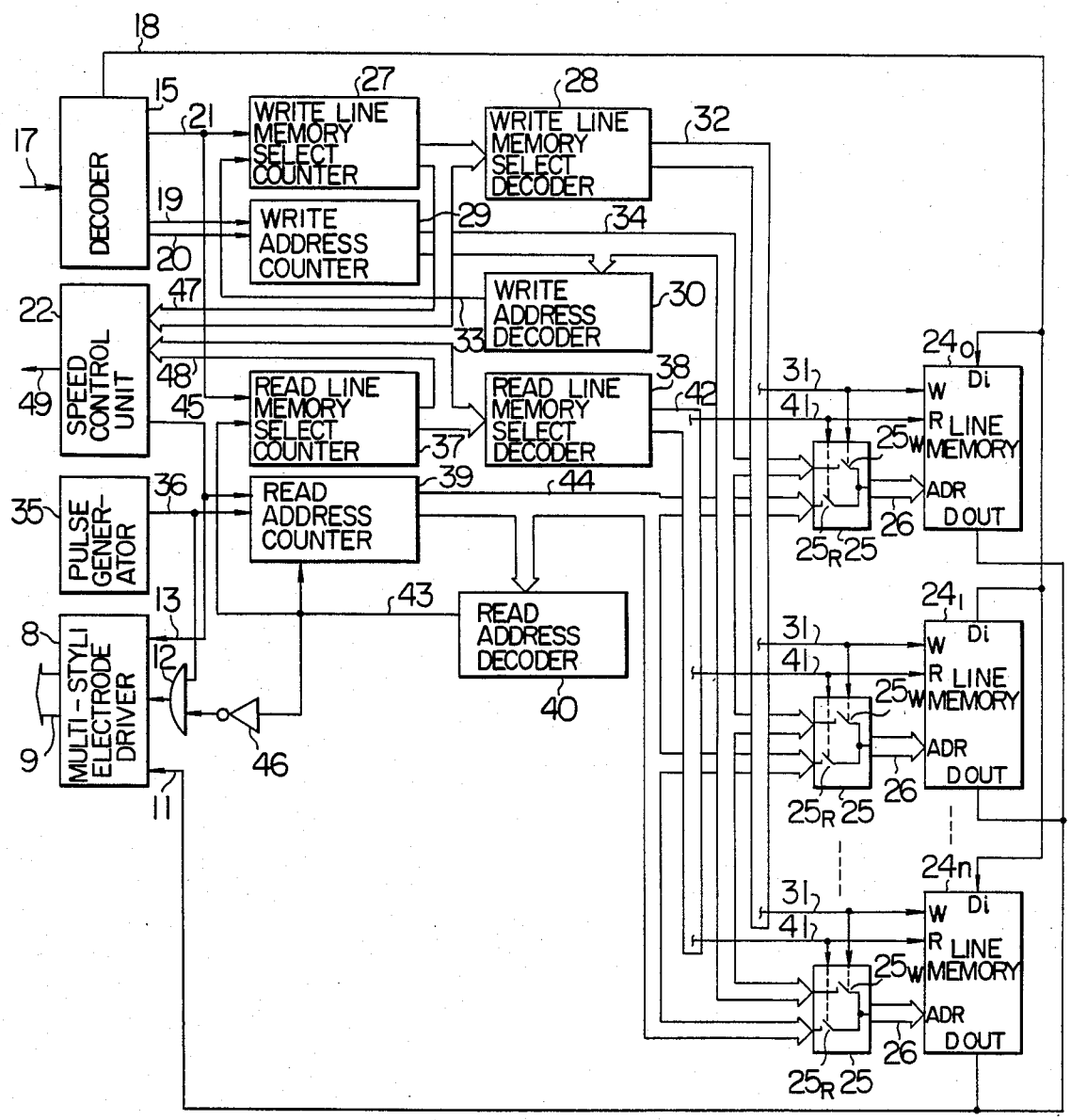
FIG. 2 shows a circuit diagram of a memory unit shown in FIG. 1.

A receiving unit for receiving the facsimile signal comprises a modem 14 and a decoder 15. The modem 14 demodulates a modulated facsimile signal 16 transmitted through a transmission line to a digital facsimile signal 17. The decoder 15 decodes the facsimile signal 17 to produce a one-line image data signal 18, a one-line image transfer clock 19, a one-line image start pulse 20 and a reset pulse 21, which are sent to the memory 10. Numeral 22 denotes a speed control unit for controlling the record paper feed pulse motor 4 and numeral 23 denotes a pulse motor drive circuit. The memory 10 which temporarily stores the image signal from the decoder 15 has a plurality of 1×m-bit line memories $24_0$–$24_n$ and selectors 25 for selecting one of the line memories $24_0$–$24_n$, as shown in FIG. 2. The selectors 25 each has a write selection switch $25_W$ and a read selection switch $25_R$. In the write and read operations, the selection switches $25_W$ and $25_R$ are selected in an endless fashion to repeat the sequence of first stage line memory $24_0 \rightarrow$ final stage line memory $24_n \rightarrow$ first stage line memory $24_0$ to supply address signals 26 of the line memories $24_0$–$24_n$. The operation of the memory 10 is now explained with reference to FIG. 2.

A memory write unit comprises a write line memory select counter 27, a write line memory select decoder 28, a write address counter 29 and a write address decoder 30 for storing the image data 18 in the line memories $24_0$–$24_n$.

The write line memory select counter 27 and the write line memory select decoder 28 supply a write enable signal 31 for selecting one of n+1 line memories $24_0$–$24_n$. Numeral 32 denotes 0-n write enable signal lines. The count of the counter 27 is reset to zero by a reset pulse 21. It is incremented by one by a rise of a write count pulse 33 which is produced by decoding a write address signal 34 of the write address counter 29 by the decoder 30. When the counter 29 counts m, it produces an output. The write address counter 29 supplies the write address signal 34 to write the one line of m-bit image data to the selected line memory. It is reset to zero by the one-line image start pulse 20 from the decoder 15 of the receiving unit. The counting is started by the one-line image transfer clock 19 and stopped when the count reaches m. When the write enable signal 31 is ON, the write address signal 34 is selected by the turn-on of the write selection switch $25_W$ of the selector 25 to produce an address signal 26 for the line memories. The count of the write line memory select counter 27 changes from n to 0. In this manner, the image data 18 is sequentially stored in the 0-n line memories.

A memory readout unit comprises a read line memory select counter 37, a read line memory select decoder 38, a read address counter 39, a read address decoder 40 and a pulse generator 35 for reading out the image data stored in the 0-n line memories $24_0$–$24_n$.

The read line memory select counter 37 and the read line memory select decoder 38 supply a read enable signal 41 for selecting one of n+1 line memories $24_0$–$24_n$. Numeral 42 denotes 0-n read enable signal lines. The counter 37 is reset to zero by the reset pulse 21. It is incremented by one at a rise of a read count pulse 43 which is produced by decoding a read address signal 44 of the read address counter 39 by the decoder 40. When the count of the counter 39 reaches m, it produces an output. The read address counter 39 supplies the read address signal 44 for reading out the one line of m-bit image data from the selected line memory. It is reset to zero by a memory read signal 45 from the speed control unit 22. The counting is started by the clock pulse 36 from the pulse generator 35 and when the count reaches m, the read count pulse 43 is turned ON and the counting is stopped. When the read enable signal 41 is ON, the read address signal 44 is selected by the turn-on of the read select switch $25_R$ of the selector 25 to produce an address signal 26 for the line memories. The count of the read line memory select counter 37 changes from n to 0. In this manner, the image data 11 of the 0-n line memories are sequentially read out for each input of the memory read signal 45.

The memory read signal 45 is supplied to the multi-styli electrode driver 8 as the one-line image start pulse 13. The clock pulse 36 from the pulse generator 35 and an inverted version of the read count pulse 43 from the decoder 40 inverted by an inverter 46 are ANDed and a resulting signal is supplied as the one-line image transfer clock 12. The one-line image data 11 is also supplied.

Figure 3:
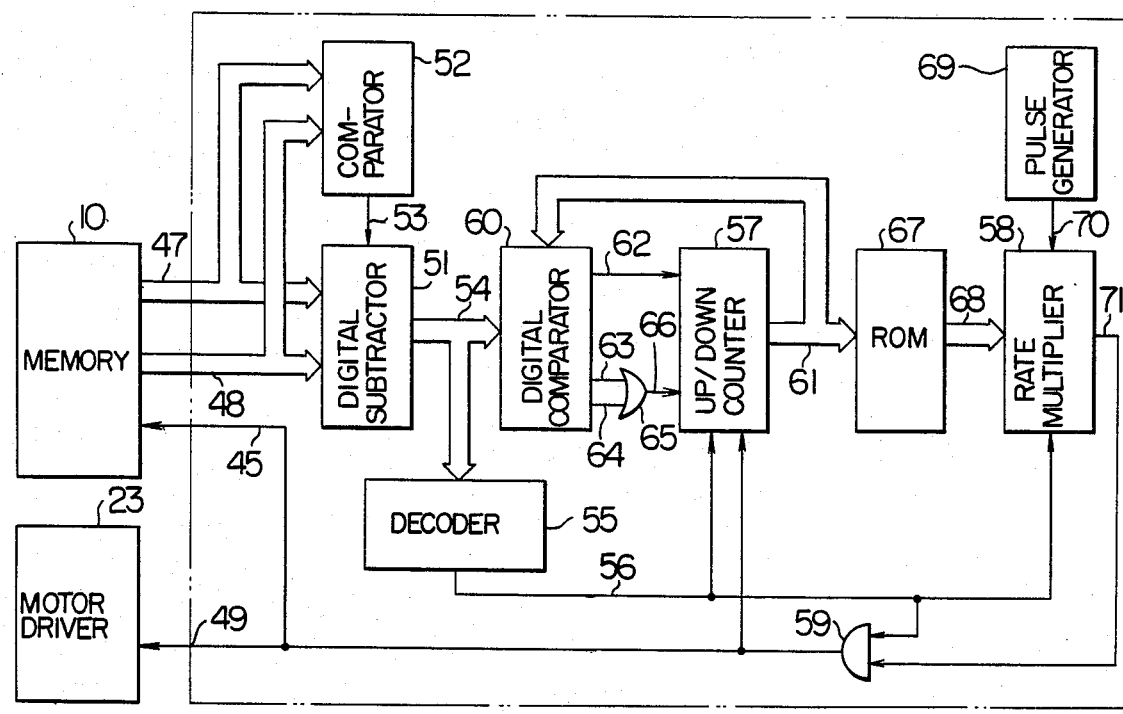
FIG. 3 shows a circuit diagram of a pulse motor speed control unit shown in FIG. 1.
Figure 4:
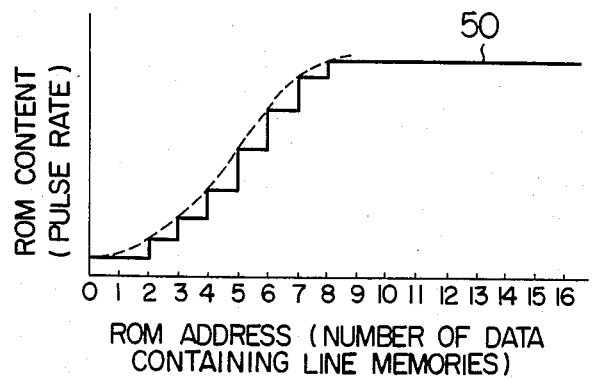
FIG. 4 shows an example of a stored pattern of a ROM shown in FIG. 3.

Referring to FIGS. 3 and 4, the speed control unit 22 for controlling the pulse motor 4 is now explained. The speed control unit 22 calculates the number of data containing line memories {(write line memory address)-(read line memory address)} from the count 47 (write line memory address signal) of the write line memory select counter 27 of the memory 10 and the count 48 (read line memory address signal) of the read line memory select counter 37, and controls the pulse interval of the drive pulse signal 49 supplied to the pulse motor 4 in accordance with a pulse motor acceleration/deceleration pulse rate pattern shown by a curve 50 in FIG. 4. It also supplies a memory read signal 45 for reading out the line memory to the memory 10.

The number of data containing line memories of the memory 10 is calculated by a digital subtractor 51. The write line memory address signal 47 is compared with the read line memory address signal 48 by the comparator 52, and if the address signal 47 is smaller, the most significant bit 53 of the address signal 47 is set to 1 before the subtraction. Thus, the subtractor 51 always outputs a positive number representative of the number 54 of data containing line memories. The resulting number 54 of data containing line memories is decoded by a decoder 55. When the number 54 of data containing line memories is zero, the decoder 55 produces 0 decode output 56. This decode output 56 clears an up-down counter 57 to zero and resets a rate multiplier 58. It also turns off a gate 59.

On the other hand, a digital comparator 60 compares the number 54 of data containing line memories with the count 61 of the up-down counter 57. If the number 54 of data containing line memories is larger than the count 61, an output 62 is produced, if the number 54 of data containing line memories is smaller than the count 61, an output 63 is produced, and if the number 54 of data containing line memories is equal to the count 61, an output 64 is produced. The output 62 causes the up-down counter 57 to assume a count-up mode, and the outputs 63 and 64 are ORed by an OR circuit 65 and an output 66 thereof causes the up-down counter 57 to assume a count-down mode. The up-down counter 57 counts up or down the pulse output from the gate 59 or the memory read signal 45.

The comparator 60 and the up-down counter 57 function to determine the increase or decrease of the number of data containing line memories to increase or decrease the pulse rate.

The count 61 of the up-down counter 57 specifies an address of a ROM 67. An example of a stored pattern of the ROM 67 is shown by the curve 50 in FIG. 4, in which an abscissa represents a ROM address (the number of data containing line memories) and an ordinate represents a ROM content (pulse rate). When the address is specified by the count 61, the ROM 67 produces a digital output 68 in accordance with the stored content. The rate multiplier 58 frequency-divides a pulse from a pulse generator 69 in accordance with the magnitude of the digital output 68 to produce a pulse 71. When the digital output 68 is small, it produces a pulse of long pulse interval, and when the digital output 68 is large, it produces a pulse of short pulse interval. In this manner, the pulse output 71 is outputted from the gate 59 as the memory read signal 45 or the drive pulse signal 49 except when the number 54 of data containing line memories is zero.

The drive pulse signal 49 is sent to the drive circuit 23 shown in FIG. 1 to drive the pulse motor 4.

In this manner, by temporarily storing the image data in the memory and feeding the record paper and recording the image at the speed determined by the number of data containing line memories, the motor can be driven in accordance with an acceleration/deceleration pattern which fits to the response capability of the record paper feed drive motor, for the image data transmitted at a high rate.

The operations of the respective units in the embodiments of FIGS. 1-4 are explained in detail with reference to waveforms shown in FIG. 5.

A receiving signal 72 indicates that the receiver is in a recording operation. The reset pulse 21 resets the receiver system when the receiver starts to receive the facsimile signal. The one-line image data 18, the one-line image transfer clock 19 and the one-line image start pulse 20 are the output signals from the decoder 15 shown in FIGS. 1 and 2. The one-line image start pulse 20 indicates the beginning of data, and the one-line image transfer clock 19 indicates that the image data 18 is present in one cycle of the pulse. The number of data is m. The write line memory address signal 47, the write counter pulse 33, the read line memory address signal 48 and the read counter pulse 43 are the output signals from the memory 10 shown in FIGS. 1-3 and they specify the line memories to be written and read, respectively. The address signals 47 and 48 are counted up at the rises of the counter pulses 33 and 43, respectively. The one-line image transfer clock 12 is used to send the data to the multi-styli electrode driver 8 shown in FIGS. 1 and 2 and it is produced while the counter pulse 43 is zero.

The number 54 of data containing line memories, the ROM address signal 61 (the count of the up-down counter 57 shown in FIG. 3), the memory read signal 45 (pulse motor drive signal) and the ROM output signal 68 are the output signals from the pulse motor speed control unit 22 shown in FIGS. 1-3. The signal 54 indicates a difference between the write line memory address signal 47 and the read line memory address signal 48. The signal 61 is the count of the up-down counter 57 shown in FIG. 3 and it specifies the address of the speed pattern table ROM 67. The memory read signal 45 commands the drive of the pulse motor and the readout of the line memories by the output 36 of the pulse generator 35 shown in FIG. 2. The ROM output signal 68 is the output signal from the speed pattern table ROM 67. It controls the pulse interval of the memory read signal 45. A record paper displacement 73 indicates the displacement of the record paper when the pulse motor is driven at the timing of the memory read signal 45.

Figure 5:
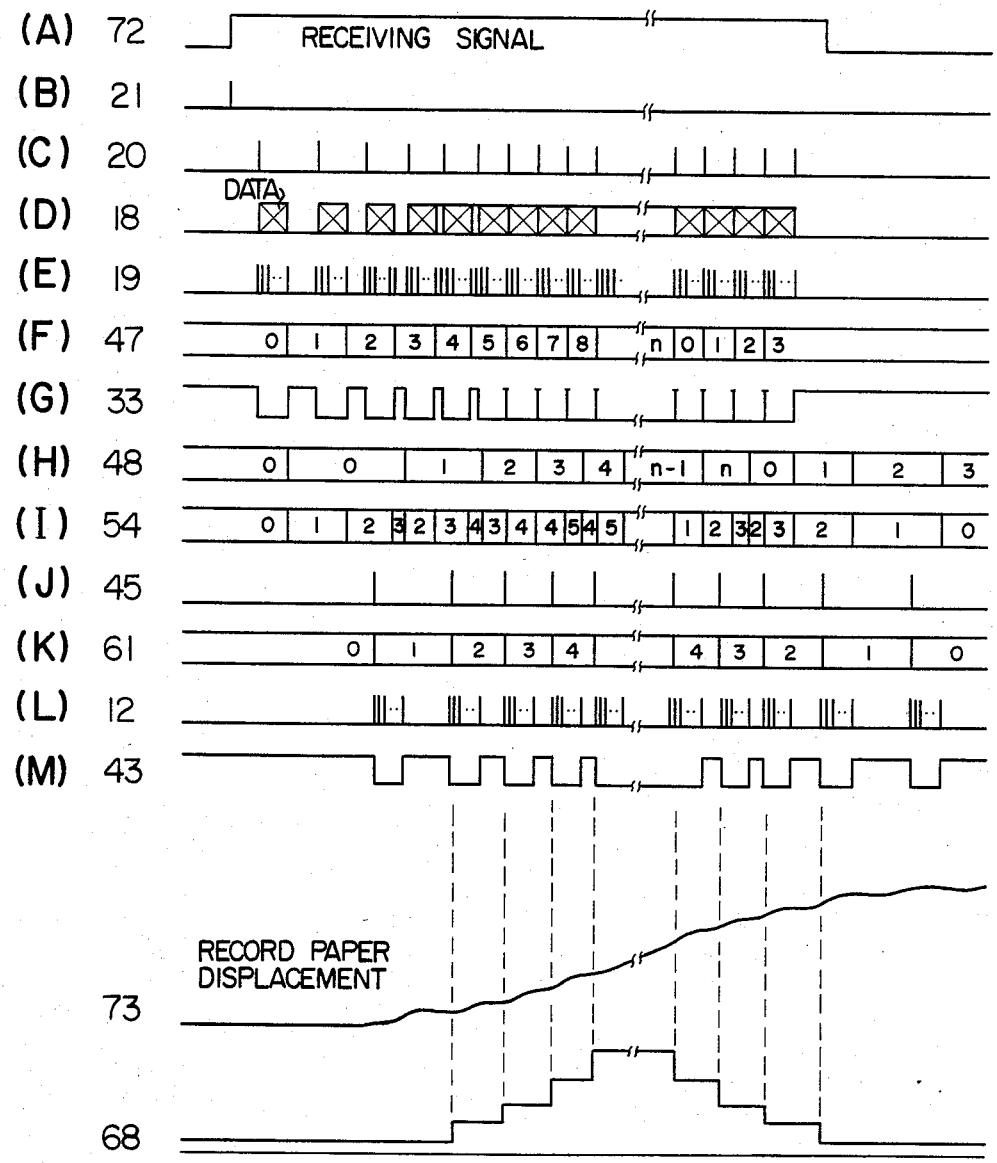
FIG. 5 shows waveforms at various points of the facsimile receiver of the present invention shown in FIGS. 1–4.

When the received one-line image data 18 is impputted in a time relation shown in FIG. 5, it is stored in the line memory at the timing of the address signal 47. When the signal 54 indicating the number of data containing line memories reaches a value 1, the rate multiplier 58 (output pulse generator) is activated to generate the memory read signal 45 to read out the image data from the line memory. By controlling the difference between the image data 18 and the number of image data read from the line memory, that is, the number of lines stored in the line memories (represented by the number 54 of data containing line memories), the acceleration/deceleration control can be effected smoothly.

Figure 6:
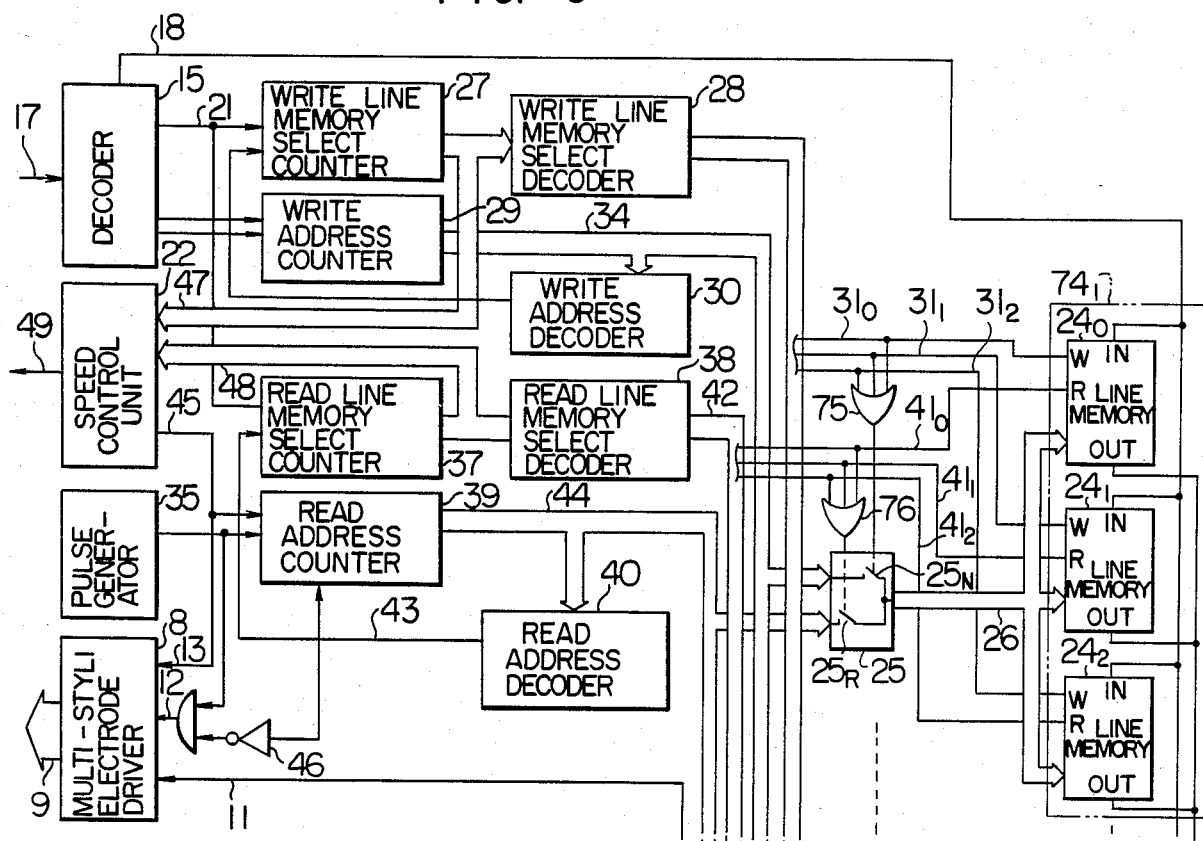
FIG. 6 shows a circuit diagram of another embodiment using the recording method of the present invention.

Referring to FIG. 6, another embodiment of the memory in accordance with the recording method of the present invention is explained.

In the present embodiment, the plurality of line memories $24_0$–$24_n$ are divided into groups $74_1$–$74_n$ each having a plurality of line memories (three in the embodiment shown) and a common address signal 26 is applied to each group. The other configuration is identical to that of the memory shown in FIG. 2, and the like numerals to those of FIG. 2 are used. The write memory select counter 27 and the write line memory select decoder 28 supply write enable signals $31_0$, $31_1$, $31_2$ for selecting one group of line memories (three in FIG. 6) from the plurality of line memories $24_0$–$24_n$. The write enable signals $31_0$, $31_1$ and $31_2$ are ORed by an OR circuit 75. If one of those signals is ON, the selector 25 is activated to supply the write address signal 34 to the line memories $24_0$, $24_1$ and $24_2$ as the common address signal 26. In this manner, the image data 18 is stored in the line memories $24_0$, $24_1$ and $24_2$.

The read line memory select counter 37 and the read line memory select decoder 38 supply read enable signals $41_0$, $41_1$ and $41_2$ for selecting one group of line memories (three in FIG. 6) from the plurality of line memories $24_0$–$24_n$. The read enable signals $41_0$, $41_1$ and $41_2$ are ORed by an OR circuit. When one of those signals is ON, the selector 25 is activated to supply the read address signal 44 to the line memories $24_0$, $24_1$ and $24_2$ of the line memory group $74_1$ as the common address signal 26. In this manner, the image data 18 stored in the line memories $24_0$, $24_1$ and $24_2$ are read out.

By constructing the memory 10 such that the plurality of line memories are read and written one group at a time as shown in FIG. 6, only one selector 25 is needed for each group and as many selectors as the number of line memories are not necessary.

Another embodiment of the pulse motor speed control unit 22 is explained with reference to FIGS. 7-9.

Figure 7:
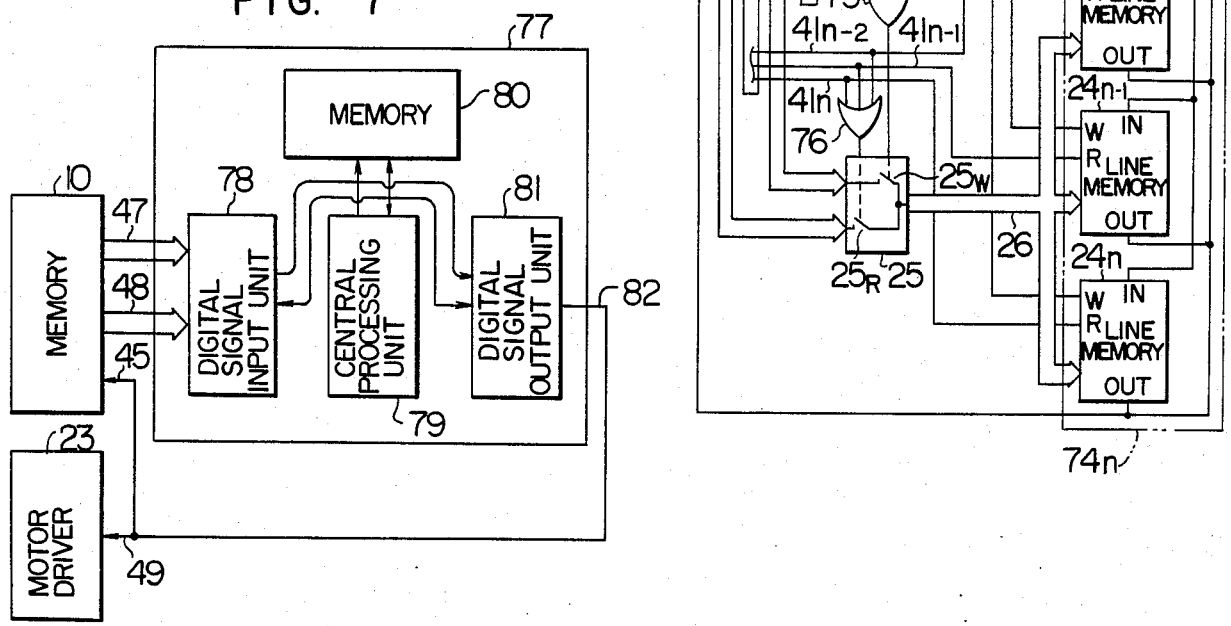
FIG. 7 shows a circuit diagram of another embodiment of the pulse motor speed control unit using the recording method of the present invention.
Figure 8:
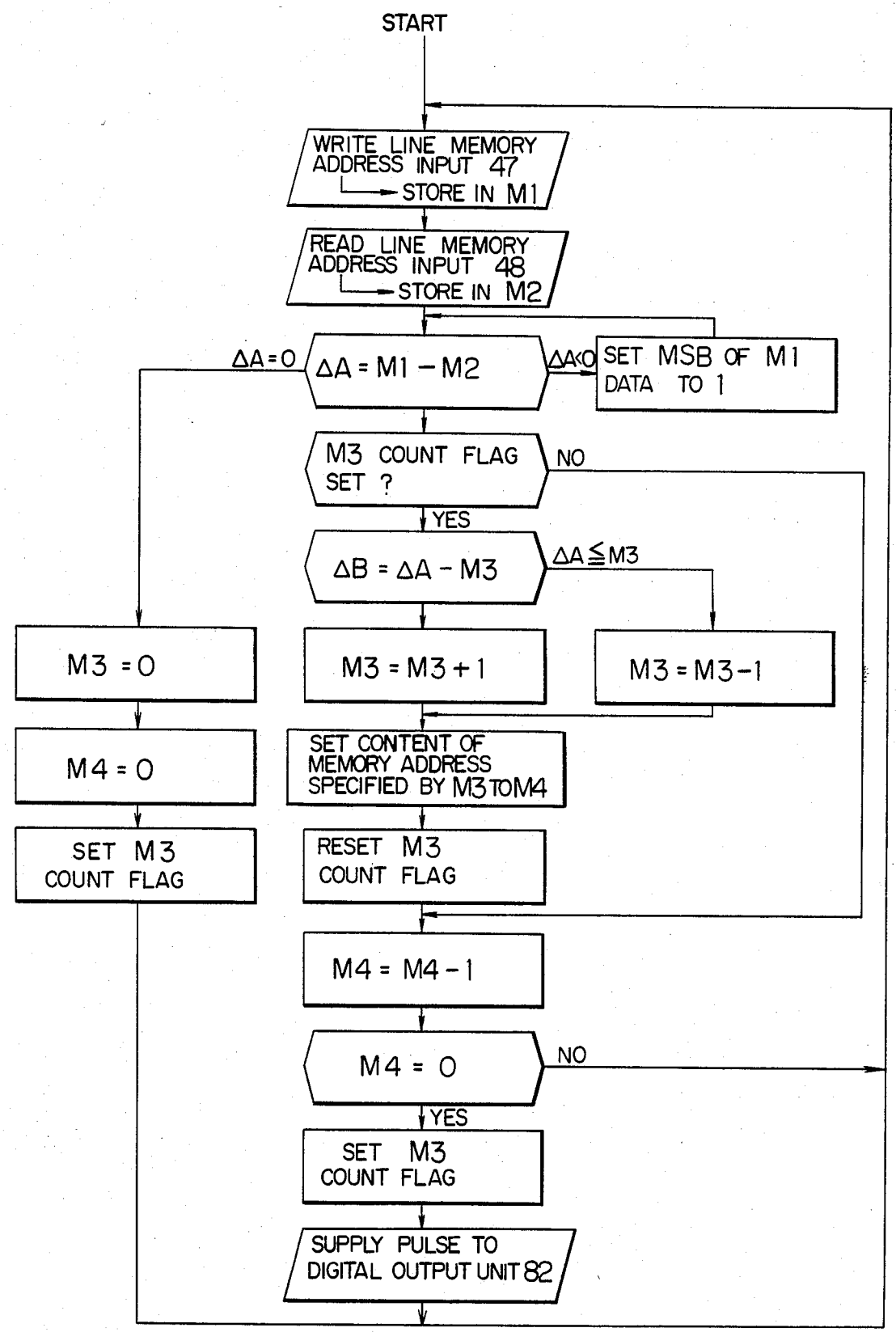
FIG. 8 shows processing steps of a central processing unit shown in FIG. 7.
Figure 9:
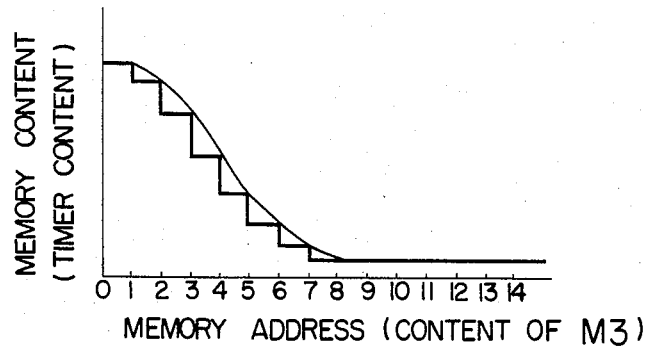
FIG. 9 shows an example of a stored pattern in the central processing unit shown in FIG. 7.

FIG. 7 shows a circuit configuration which uses a microcomputer 77 and FIG. 8 shows the operation flow.

The microcomputer 77 of FIG. 7 comprises a digital signal input unit 78, a central processing unit 79, a memory unit 80 and a digital signal output unit 81. The digital signal input unit 78 supplies the write line memory address 47 from the memory 10 and the digital signal of the read line memory address 48 to the central processing unit 79. The memory 80 comprises a ROM for storing an operating program shown in FIG. 8 and a RAM for storing input data. The central processing unit 79 carries out the input and output of the data, addition, subtraction, multiplication and division operations, and logical operations in accordance with the operating program shown in FIG. 8. The digital signal output unit 81 produces a pulse output 82 which is used as the signal 45 or 49 to the memory 10 or the pulse motor speed control driver 23. The operating steps shown in FIG. 8 are now explained.

The write line memory address 47 and the read line memory address 48 are inputted and stored in memories M1 and M2, respectively. Then, in order to calculate the number of data containing line memories, a subtraction operation of $\Delta A = M1 - M2$ is carried out. If $\Delta A = 0$, the memories M3 and M4 are reset to zero and a M3 count flag is set. If $\Delta A < 0$, the most significant bit of the M1 data is set to 1 and the operation of $\Delta A = M1 - M2$ is again carried out to calculate the positive number of data containing line memories. Then, a step for generating the pulse having a pulse rate determined by the number of data containing line memories is carried out.

The current number $\Delta A$ of data containing line memories and a past number M3 of the data containing line memories are compared. If $\Delta A > M3$, that is, if the number $\Delta A$ of data containing line memories is increasing, a step of $M3 = M3 + 1$ is carried out to increase the pulse rate. On the other hand, if $\Delta A \leq M3$, that is, if the number $\Delta A$ of data containing line memories is decreasing, a step of $M3 = M3 - 1$ is carried out to decrease the pulse rate. As shown in FIG. 9, the pulse having the desired pulse rate is generated by loading the content of the memory address specified by the content of the memory M3 to a timer count memory M4, carrying out a step of $M4 = M4 - 1$ for each circulation of the program, and when M4 reaches 0, supplying the pulse output to the digital signal output unit 81. If M4 is not zero after the decrementation step of $M4 = M4 - 1$, the program returns to the start point. If $M4 = 0$, the M3 count flag is set, the pulse is outputted and the program returns to the start point.

In this manner, a complex pulse motor speed control is carried out by the microcomputer 77.

Figure 10:
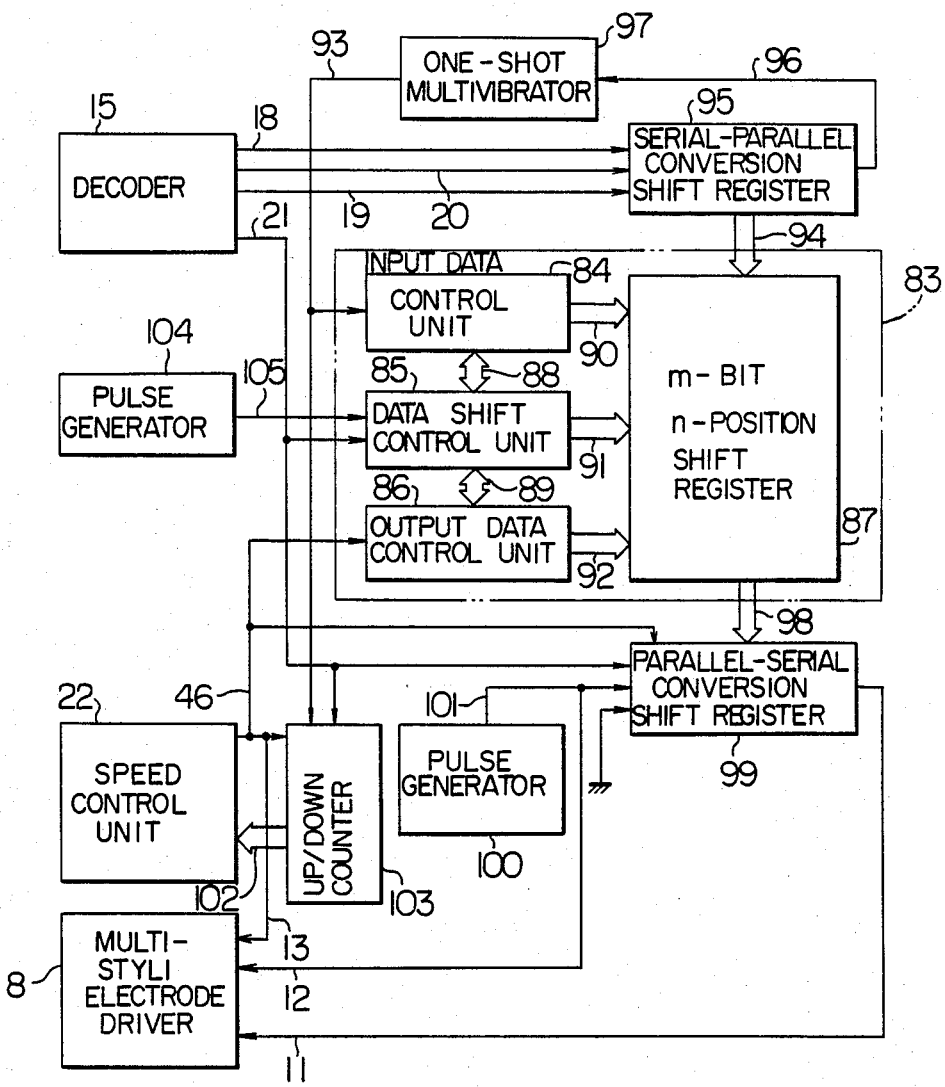
FIG. 10 shows a circuit diagram of another embodiment of the memory using the recording method of the present invention.

FIG. 10 shows other embodiment in accordance with the recording method of the present invention which uses a first-in first out (FiFo) register.

In FIG. 10, a FiFo 83 for shifting the m-bit image data 18 by n positions comprises an input data control unit 84, a data shift control unit 85, an output data control unit 86, an m-bit n-position shift register 87 and communication buses 88, 89, 90, 91 and 92. The FiFo 83 reads the parallel data 94 which is the image data into the shift register 87 by a data input signal 93 to be described later, and automatically shifts the data to the output shift register. Thus, it sequentially stores the input data in the output shift register. In this manner, the data can be taken out of the output shift register in the sequence of input. The operation of FIG. 10 is now explained.

The image data 18 from the receiving unit 15 is converted to parallel data 94 by a serial-parallel conversion shift register 95. The shift register 95 is cleared by the image start pulse 20 to produce a 0 output. As LSB register is preset to 1. Thus, when m bits of image data have been inputted, 1 is shifted to an MSB register of the shift register 95 to indicate that m bits of image data have been shifted. A one-shot multivibrator 97 is triggered by a rise of a signal 96 of the MSB register 96 to produce the data input signal 93.

In reading out the data, when the memory read signal 45 of the speed control unit 22 is supplied, the data 98 from the FiFo 83 is loaded to the parallel-serial conversion shift register 99. The data is shifted by the clock pulse 101 from the pulse generator 100. The image data 11 is serially outputted from a serial terminal of the shift register 99. The image data 11, the image start pulse 13 and a clock pulse 100 as the image transfer clock 12 are sent to the multi-styli electrode driver 8 of the recording unit.

The number 102 of the data containing shift registers of the FiFo 83 is derived from an up-down counter 103. When the data is inputted to the up-down counter 103, it is incremented by one by the data input signal 93 to increase the number of store. When the data is read out, the up-down counter 103 is decremented by one by the memory read signal 45 to decrease the number of store. In this manner, the number of image data stored in the FiFo 83 can be always indicated. The number 102 of data containing shift registers is sent to the speed control unit 22. A pulse generator 104 supplies a clock pulse 105 for shifting the data of the FiFo 83.

Figure 11:
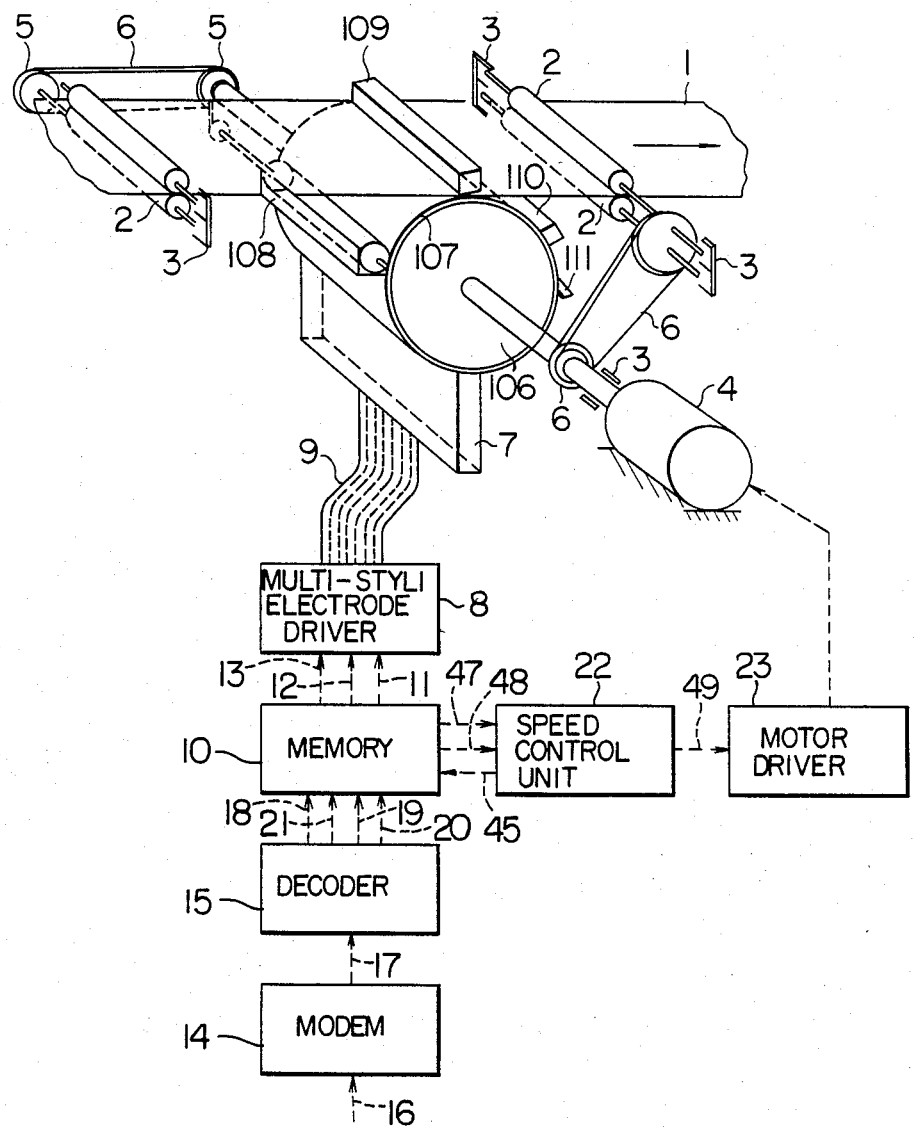
FIG. 11 illustrates another embodiment using the recording method of the present invention, which is applied to a transfer type plain paper facsimile receiver.

Referring to FIG. 11, another embodiment of the recording method in the facsimile receiver of the present invention which is applied to a transfer type plain paper facsimile receiver is explained. FIG. 11 is different from FIG. 1 only in the facsimile receiver and other identical elements are designated by the like numbers.

A mechanism for feeding the record paper 1 comprises rollers 2 for holding the record paper 1 on both sides thereof, bearings 3 for supporting the rollers 2, a pulse motor 4 for driving the rollers 2 and pulleys 5 and belts 6 for transmitting the rotation of the pulse motor 4 to the rollers 2. A drum 106 has a recording medium 107 to be electrostatically charged, on an outer periphery thereof, and is coupled to the pulse motor 4 to rotate in contact with the record paper 1. Numeral 108 denotes a developing unit, numeral 109 denotes a transfer charger, numeral 110 denotes a discharger and numeral 111 denotes a cleaner.

The recording method in the facsimile receiver shown in FIG. 11 is explained. In recording, an electrostatic latent image is charged on the recording medium 107 on the outer periphery of the drum 106 by the multi-styli electrode body 7. Toner is deposited to the electrostatic latent image by the developing unit 108. The toner on the drum is transferred to the record paper 1 by the transfer charger 109 and deposited to the record paper 1 to form the image. The toner which remains undeposited is discharged by the discharger 110 and removed from the outer surface of the drum by the cleaner 111 so that continuous recording is carried out.

The control method using the memory explained in conjunction with FIG. 1 is suitable to drive the pulse motor in the series of recording methods, and FIG. 1 can be used without modification. The drive motor may be a D.C. motor or an A.C. motor instead of the pulse motor.

In accordance with the present invention, the received image data is temporarily stored in the memory and the image data stored in the memory is sequentially read out in accordance with the response capability of the drive motor which feeds the record paper so that the motor is accelerated or decelerated to control the recording. Accordingly, for the image data transmitted at a high rate, the drive motor can be driven in accordance with the acceleration/deceleration pattern which fits the response capability of the drive motor and the image can be recorded with a line-by-line fine speed control. The memory needs a capacity which is sufficient to store the data before the drive motor reaches the highest record speed. Accordingly, a large capacity memory is not required and a less expensive high speed facsimile receiver is provided.

We claim:

1. In a variable speed sub-scan system facsimile receiver having a receiving unit for demodulating a coded facsimile signal to an image data, a memory unit for storing the image data, a paper feed unit for feeding a record paper at a variable speed in accordance with a signal from said receiving unit and a recording unit for forming an image on the record paper;
a recording method comprising the steps of;
temporarily storing the image data line by line in said memory unit;
detecting the number of stored lines;
issuing a variable speed command to said paper feed unit in accordance with the detected number of stored lines to control a paper feed speed by a speed pattern determined by the number of stored line; and
reading out the image signal, one line at a time, from said memory unit for every one line movement of said record paper to record the image on said record paper by said recording unit.

2. A recording method in a facsimile receiver according to claim 1 wherein said memory unit comprises a plurality of line memories, a memory write circuit, a memory read circuit and a line memory selector, said image data is temporarily stored in said line memories line by line, the number of data containing line memories is detected, the variable speed command is issued to said paper feed unit in accordance with the detected number of data containing memories to control the paper feed speed, the image signal is read out from said line memories, one line at a time for every one line movement of the record paper to record the image on the record paper by said recording unit.

3. A recording method in a facsimile receiver according to claim 2 wherein the data read and write from and to said plurality of line memories of said memory unit are effected for each line memory.

4. A recording method in a facsimile receiver according to claim 2 wherein said plurality of line memories of said memory unit are divided into a plurality of line memory groups and the data read and write are effected for each line memory group.

5. A recording method in a facsimile receiver according to claim 3 wherein the data read and write from and to said plurality of line memories of said memory unit are effected in an endless fashion which repeats a cycle of first stage to final stage to first stage of the line memories.

6. A recording method in a facsimile receiver according to claim 1 wherein said memory unit has an m-bit n-position shift register, the data is written in said shift register starting from the n-th output stage, the data at the (n-1)th and earlier stages are shifted by one position each time when the n-th stage output data is read out, issuing a pattern for controlling the paper feed speed in accordance with the number of data containing stages of the shift register, and reading out the n-th stage data from the shift register for every one line movement of the record paper to record the image on the record paper by said recording unit.

7. A recording method in a facsimile receiver according to claim 4 wherein the data read and write from and to said plurality of line memories of said memory unit are effected in an endless fashion which repeats a cycle of first stage to final stage to first stage of the line memories.

8. A method of recording on paper data received in the form of a coded facsimile signal, comprising the steps of:
demodulating said coded facsimile signal to produce an image data signal representing successive lines of data;
temporarily storing said image data signal in a memory unit capable of holding plural lines of data so that the data is stored line-by-line;
detecting the number of lines of data stored in said memory unit;
reading out the image data signal, one line at a time, from said memory unit at a speed depending on the detected number of lines of data stored in said memory unit; and
forming an image on record paper in accordance with the image data signal read out from said memory unit while moving said record paper at a speed depending on the detected number of lines of data stored in said memory unit, so that said record paper is moved by one line space for each line of data read out of said memory unit.

9. A method according to claim 8, wherein the speed at which said image data signal is read out of said memory unit is determined from a speed pattern on the basis of the number of lines of data stored in said memory unit.

10. A method according to claim 8, further including the steps of determining the number of lines of data present in said memory unit at successive times and controlling the speed of reading out the image data signal from said memory unit on the basis of whether the number of lines of data stored in said memory unit is increasing or decreasing.

11. A method according to claim 8, wherein said step of temporarily storing said image data signal in said memory unit includes generating first addresses representing successive storage locations in said memory unit for storing successive lines of data, said step of reading out the image data signal from said memory unit includes generating second addresses representing successive storage locations in said memory unit where successive lines of data are stored, and said step of detecting the number of lines of data stored in said memory unit includes the step of determining the difference between said first and second addresses being generated.

12. A variable speed sub-scan system facsimile receiver for recording on paper data received in the form of a coded facsimile signal, comprising:
- a receiving unit including means for demodulating said coded facsimile signal to produce an image data signal representing successive lines of data;
- means including a memory unit capable of storing plural lines of data for temporarily storing said image data signal so that data is stored in said memory unit line-by-line at the rate said coded facsimile signal is received;
- means for detecting the number of lines of data stored in said memory unit;
- means including a recording unit for forming an image on record paper in response to said image data signal;
- means for reading out to said recording unit the image data signal, one line at a time, from said memory unit at a speed depending on the detected number of lines of data stored in said memory unit as indicated by said detecting means; and
- paper feed means for feeding a record paper through said recording unit at a speed based on the output of said detecting means so that the record paper is moved by one line space for each line of data read out of said memory unit.

13. A facsimile receiver according to claim 12, wherein said means for storing said image data signal further includes first means for generating first addresses representing successive storage locations in said memory unit at which successive lines of data are to be stored as said data is received in said facsimile signal and said reading means includes second means for generating at a speed determined by the output of said detecting means second addresses representing successive storage locations in said memory unit from which successive lines of data are to be read.

14. A facsimile receiver according to claim 13, wherein said detecting means includes means for determining the difference between the first and second addresses generated by said first and second means, respectively, to detect the number of lines of data stored in said memory unit.

15. A facsimile receiver according to claim 12, further including speed control means responsive to said detecting means for controlling said reading means and said paper feed means, including means for generating a speed signal based on a predetermined speed pattern in accordance with the output of said detecting means and means for applying said speed signal to said reading means to control the speed at which lines of data are read from said memory unit and for applying said speed signal to said paper feed means to control the movement of said record paper through said recording unit.

16. A facsimile receiver according to claim 15, wherein said speed control means includes means responsive to the output of said detecting means at successive points in time for determining whether the number of lines of data present in said memory unit is increasing or decreasing, counter means for counting up or down depending on whether the number of lines in said memory unit is increasing or decreasing and means storing a plurality of signal values representing said predetermined speed pattern for reading out a signal value as said speed pattern for reading out a signal value as said speed signal in accordance with the state of said counter means.

17. A facsimile receiver according to claim 15, further including means responsive to the output of said detecting means at successive points in time for controlling generation of said speed signal depending upon whether the number of lines of data present in said memory unit is increasing or decreasing.

* * * * *